Dec. 22, 1970          G. BARKER          3,548,577

ASPARAGUS HARVESTER

Filed Oct. 25, 1968          6 Sheets-Sheet 2

INVENTOR.
GEORGE BARKER
BY
ATTORNEYS

Dec. 22, 1970   G. BARKER   3,548,577
ASPARAGUS HARVESTER
Filed Oct. 25, 1968   6 Sheets-Sheet 3

INVENTOR.
GEORGE BARKER
BY
*Lyon & Lyon*
ATTORNEYS

Dec. 22, 1970  G. BARKER  3,548,577
ASPARAGUS HARVESTER
Filed Oct. 25, 1968  6 Sheets-Sheet 4

INVENTOR.
GEORGE BARKER
BY
Lyon & Lyon
ATTORNEYS

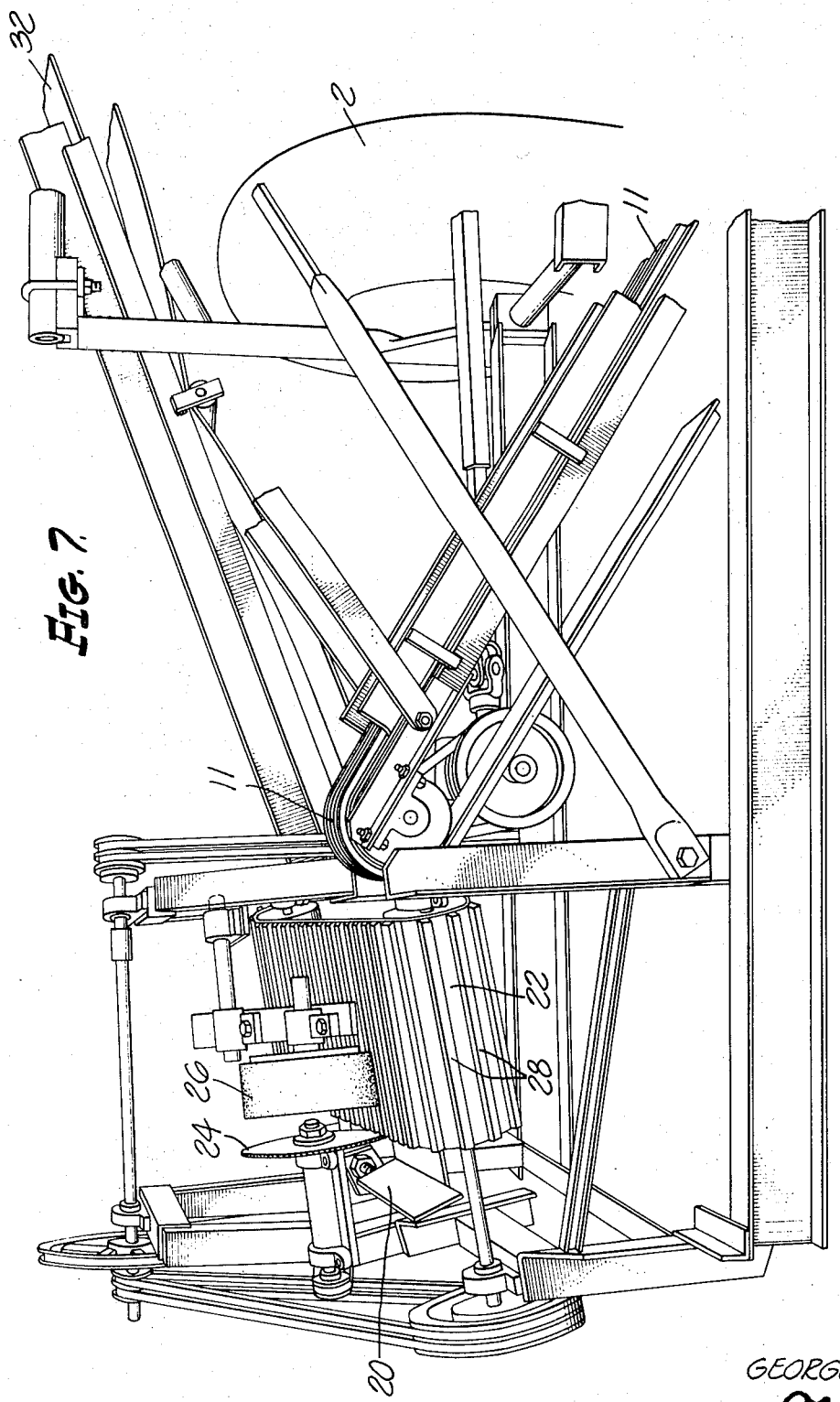

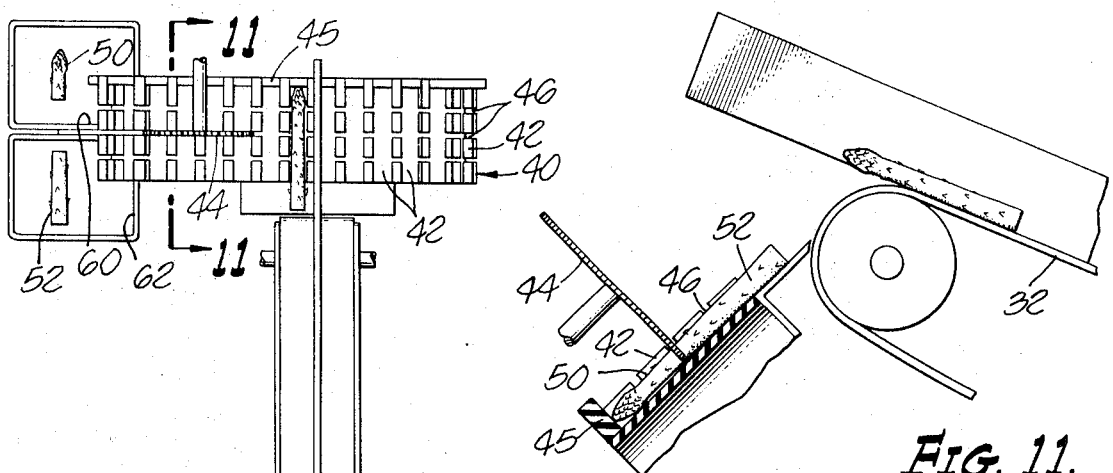
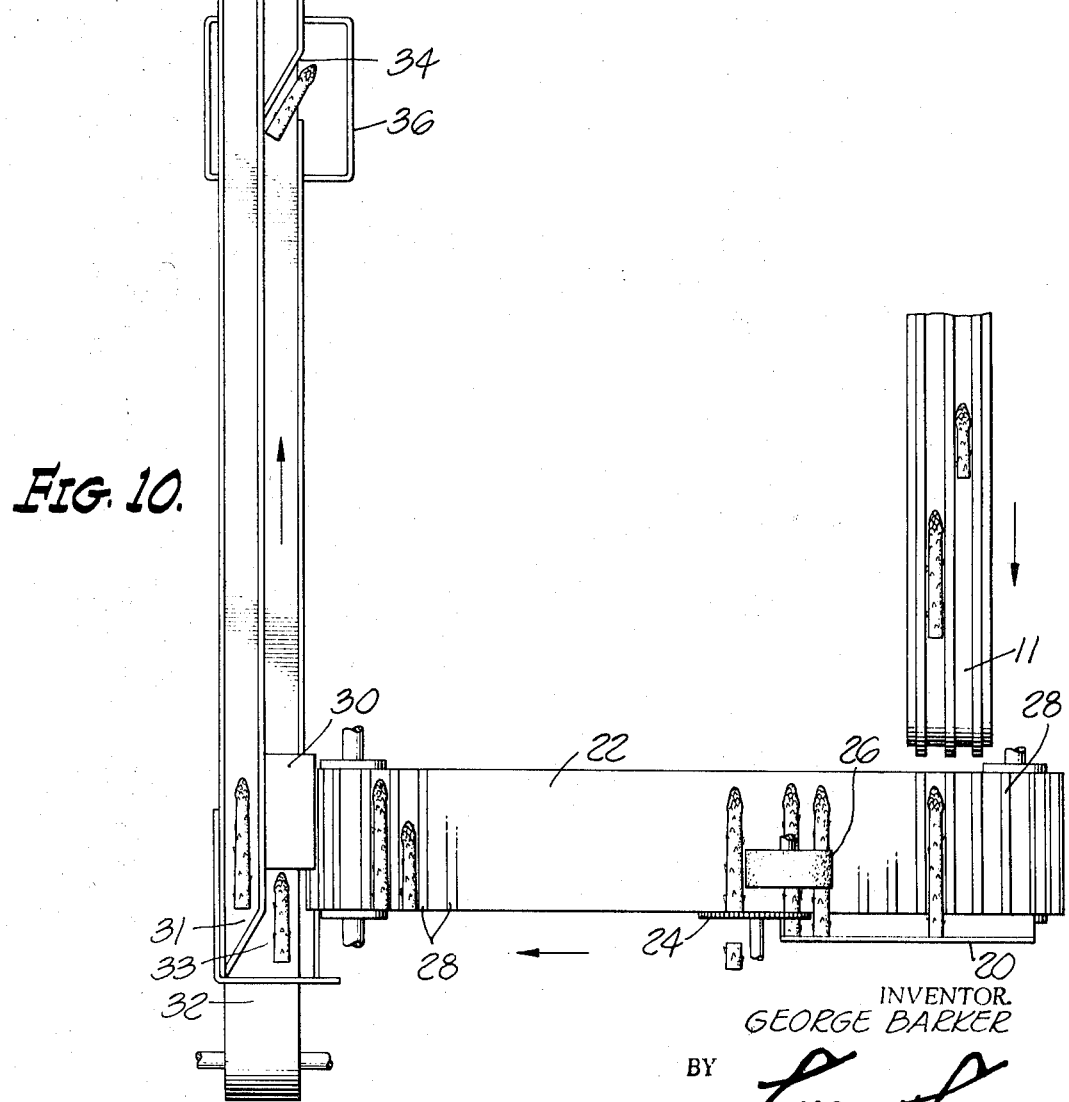

3,548,577
ASPARAGUS HARVESTER
George Barker, P.O. Box 518, Banning, Calif. 92220
Filed Oct. 25, 1968, Ser. No. 770,722
Int. Cl. A01d 45/00
U.S. Cl. 56—327                                7 Claims

ABSTRACT OF THE DISCLOSURE

An asparagus harvester which engages the growing asparagus in the field, saws the asparagus below the ground, releases the asparagus butt first onto a grooved belt, then conveys the asparagus up an incline where the asparagus is conveyed butt first onto a second grooved conveyor belt and against a stop member; this conveyor belt travels perpendicular to the first belt. After the asparagus comes to a stop, the butt portions which were growing underground are sawed off by a second saw, and the remainder of the spears are allowed to travel along this belt until they reach a sorting member at which they are sorted into two predetermined lengths; the short spears are passed directly from this member into one box. The longer spears are oriented tip first and are carried up a conveyor belt to another grooved conveyor running perpendicular and horizontal to the last conveyor. Here the longer spears are sawed to a predetermined tip length and routed to a container. The remaining cut made here are "center cuts," which are likewise routed to a container.

BACKGROUND OF THE INVENTION

Previously asparagus was cut by hand and boxed in the field by laborers cutting the spears from the underlying plants with a knife every day or two during the several months growing period. This practice left the grower subject to various problems in obtaining labor to do this hand picking and sorting. After the asparagus was cut and field processed it was then shipped to the canners or other processors who then had to further trim the asparagus and cut it to the required tip lengths and then washed it usually all by hand.

The present invention provides an apparatus whereby a processor may order certain desired asparagus tips and center cut portions directly from the grower and receive already cut and trimmed tips, ready for washing and processing.

The present apparatus is an improvement in asparagus harvesters over United States Letters Patent No. 2,791,878 for an "Asparagus Harvester," issued to Robert A. Kepner on May 14, 1957. It incorporates essentially all of the cutting and pick-up features described in that Letters Patent, but also provides new and novel features in the removal and discarding of the butt ends which have been growing underground, sorting of the stalks into desired lengths, and standardizing of the lengths of the prime tip ends to meet the processor's specifications, all in one operation, thus eliminating much of the time-consuming handling by the processor.

One of the principal objects of the present invention is the elimination of a large number of personnel who are required to cut, pick, and sort the asparagus as it is grown in the field.

Another principal object of the present invention is to provide asparagus tips to the consumer which meets his length specifications without requiring any further cutting.

A still further object of the present invention is to provide a simple and inexpensive method of cutting growing asparagus, removing the unwanted butt end, sorting the asparagus, and cutting the tips to the desired length.

Another object of the present invention is to provide an apparatus which can be maintained and operated by a very few workers.

A still further object of the present invention is to reduce the cost of harvesting and preparing asparagus to the consuming public.

These and other objects and advantages of the present invention will become apparent from the following specification when read with the accompanying drawings, in which:

DESCRIPTION OF THE DRAWINGS

FIG. 7 is an isometric projection of the feed conveyor from the harvester pick-up to the butt-cutting saw.

FIG. 8 is a detail of the length-sorting assembly taken from lines 8—8 of FIG. 2.

FIG. 9 is an elevation taken from lines 9—9 of FIG. 8 and illustrates how the length and center of gravity determines the sorting of the asparagus.

FIG. 10 is a schematic elevation indicating the various processes performed by the cutting and sorting mechanisms.

FIG. 11 is a sectional elevation of the conveyors and cutting saw taken along lines 11—11 of FIG. 10.

Referring now to FIG. 1 which illustrates the left side view of the overall asparagus harvester as view from the normal driving position, the harvester has a steerable set of front wheels 1 and rear wheels 2 which are driven by a tractor 3 and associated framework which is well known in the harvester manufacturing art.

Figure 1:
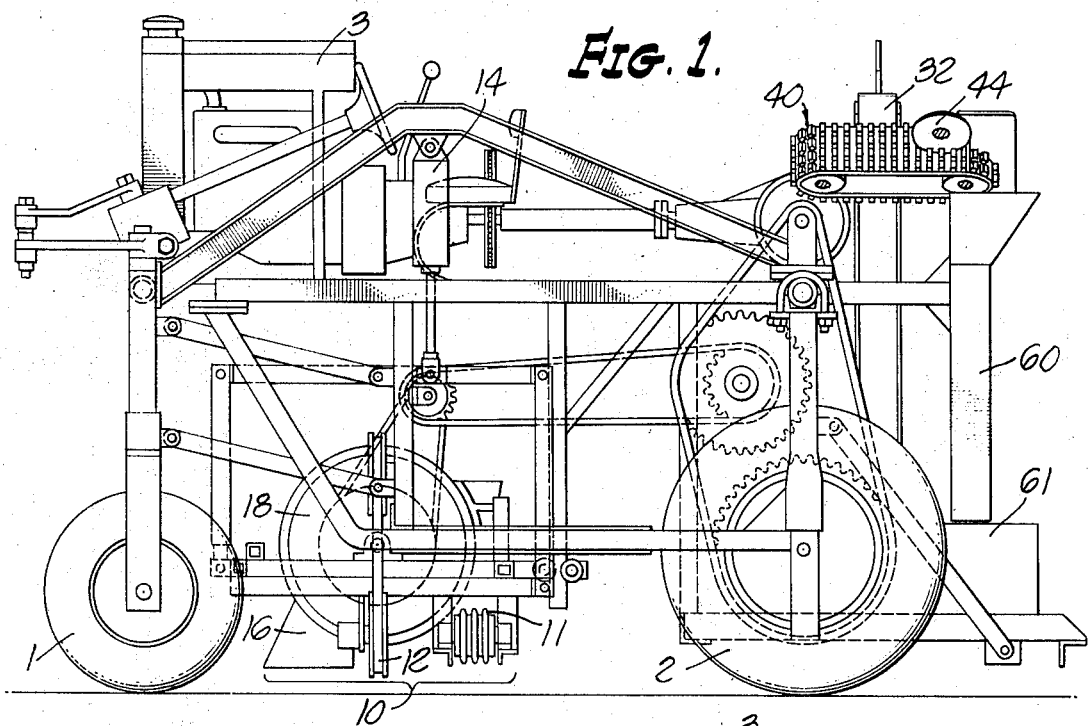
FIG. 1 is a side elevation of the asparagus harvester illustrating the location of the last cutting saw.
Figure 2:
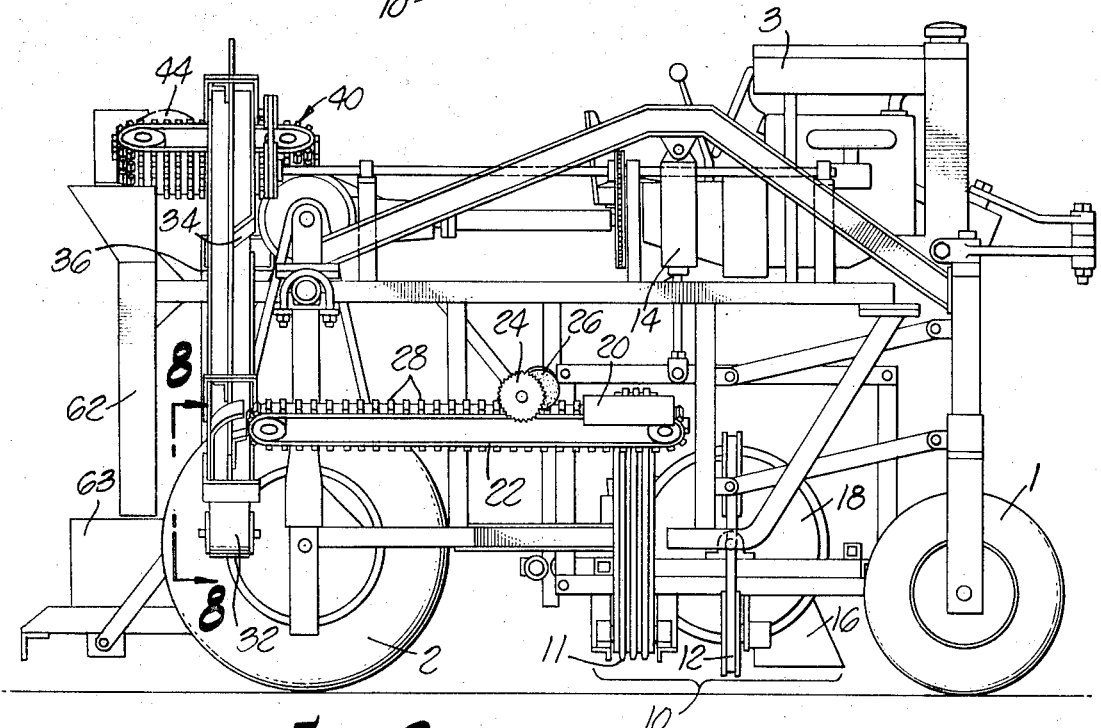
FIG. 2 is a side elevation of the asparagus harvester illustrating the first cutting saw and conveyor and sorting mechanisms between the two cutting saws.
Figure 3:
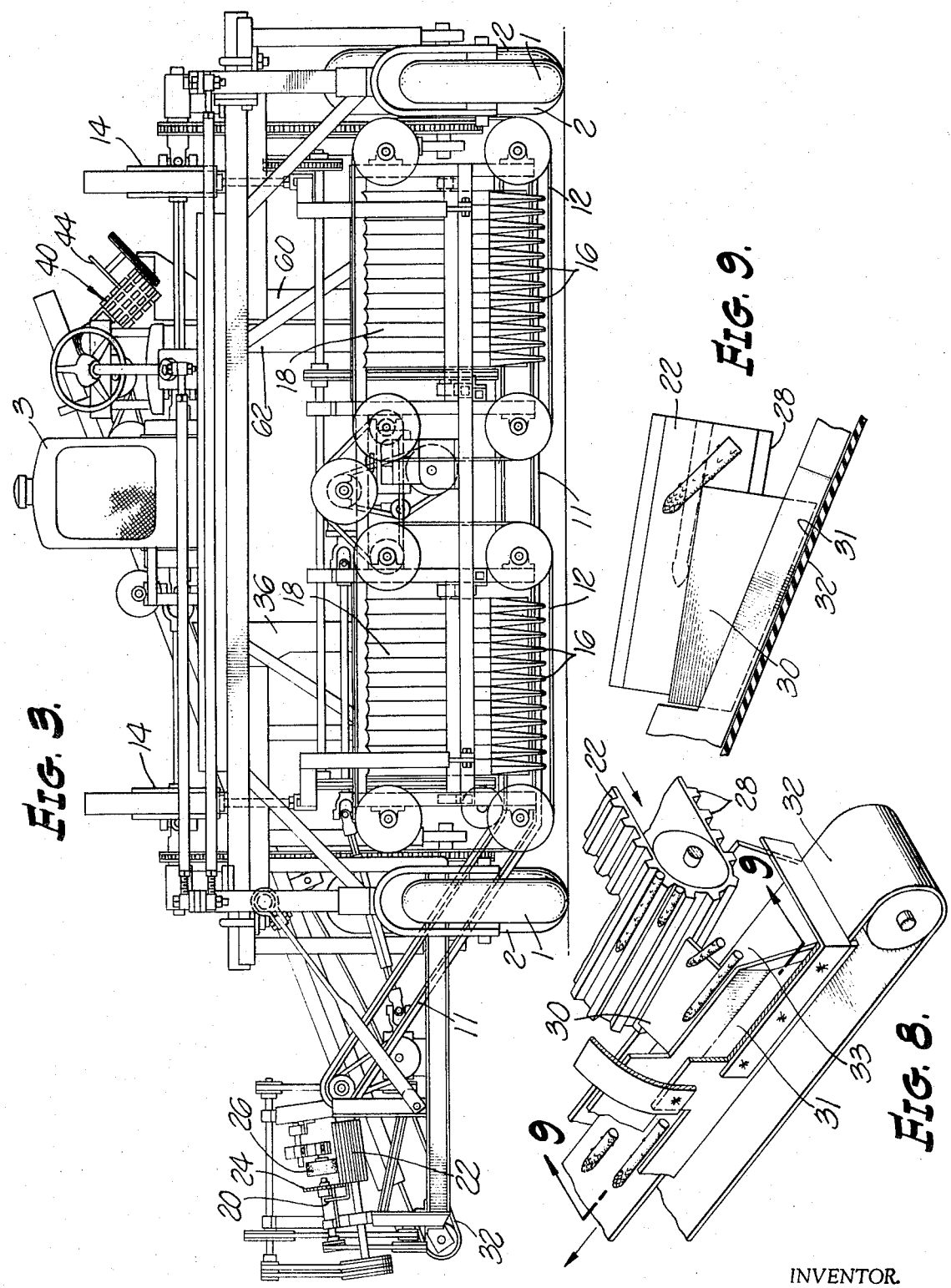
FIG. 3 is an elevation of the front end of the asparagus harvester.
Figure 4:
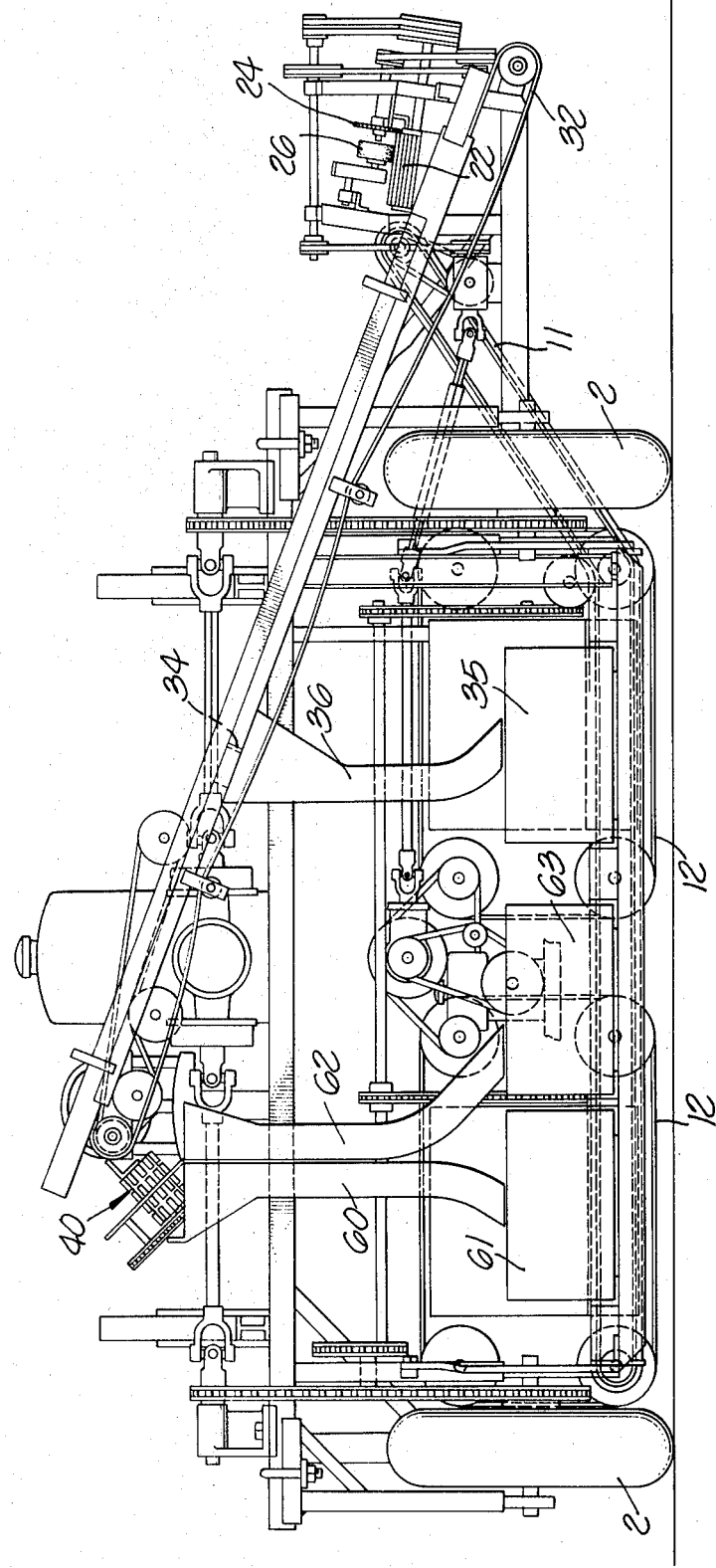
FIG. 4 is an elevation of the rear end of the asparagus harvester.

The asparagus harvester 10 and associated pick-up conveyor 11 as described in United States Letters Pat. No. 2,791,878, issued to Robert A. Kepner on May 14, 1957, is located in a frame in the forward portion of the harvester and is adjusted downwardly so that the bandsaw 12 will be cutting below the ground by hydraulic cylinders 14. Once this operation has been performed, the deflector guides 16 divide the asparagus into rows to be picked up by the harvester drum 18. The bandsaw 12 then cuts the asparagus from the ground and harvester drum 18 places it butt first on conveyor 11 as described by Kepner No. 2,791,878. The conveyor 11 then travels upwards from the horizontal, carrying the asparagus at a speed sufficient to place the asparagus butt end first against a stop 20 adjacent conveyor 22 which is traveling perpendicular to conveyor 11 as is best illustrated by FIGS. 3 and 7. To the rear of the stop 20 is a saw 24 and a roller 26. The roller holds the asparagus stalks against the conveyor 22 as the saw 24 cuts off the butt ends of the asparagus which were initially underground. These butt ends are then discarded onto the field.

Conveyor 22 is arranged with ribs 28 in between which the asparagus stalks lie and facilitates their movement along the conveyor.

After these stalks have been cut by saw 24, they pass along the conveyor to the sorting mechanism, which is best illustrated by FIG. 8. At this point, the stalks are sorted as to their length. The long stalks strike the sorting plate 30 and as their center of gravity is further toward the center of the plate 30, they are allowed to pass into bin 31 and up the conveyor 32. The shorter stalks fall over the edge of plate 30 and pass into bin 33. These shorter stalks are routed along conveyor 32 and are channeled off of the conveyor by divider 34 into a box 35, as illustrated best by FIG. 10.

Figure 5:
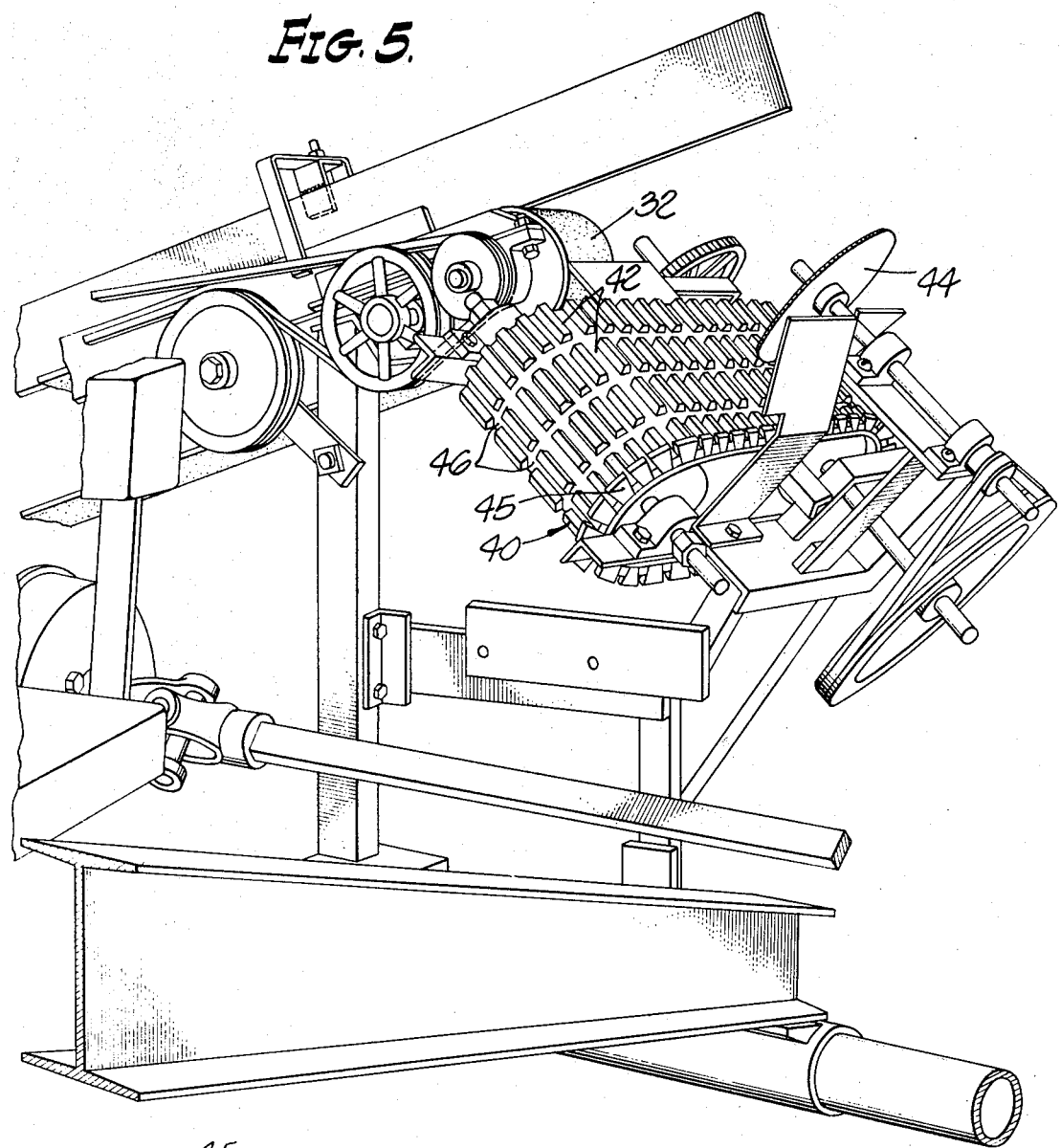
FIG. 5 is an isometric projection of the conveyors and saw utilized in cutting the asparagus tips to a specified length.
Figure 6:
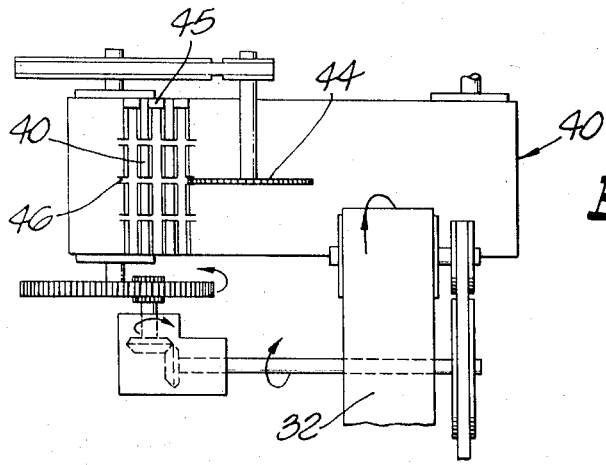
FIG. 6 is a top elevation of the device shown in FIG. 5 illustrating the movements of one conveyor to the other.

The longer stalks continue along conveyor 32 until they reach conveyor 40 and are deposited thereon. Conveyor 40, as illustrated in FIGS. 5 and 10, has segmented channels 42 on its surface. These segmented channels move the stalks perpendicular to the conveyor 32 and through saw 44, which cuts the tips off to the desired length. Saw 44 is adjustable away from stop 45 and may be placed in any of the sets of grooves 46 to provide the desired length of tip. This now leaves the operator with an asparagus tip portion 50 and a center cut portion 52. This tip portion 50 passes into a chute 60 and into a packing box 61. The center cut portions are routed by chute 62 either into packing box 63 or into packing box 35 containing the short tips depending upon the type of pack that the operator desires.

Various changes and modifications may be made in carrying out the present invention without departing from the scope and spirit thereof. Insofar as these changes and modifications are within the purview of the annexed claims, they are to be considered as part of the invention.

I claim:

1. An asparagus harvesting machine of the character described including a tractor driven frame supporting an asparagus cutting means and an asparagus pick-up and transferring means, the improvement comprising:
   a first conveyor leading from said asparagus pick-up means leading to a second conveyor means traversing said first conveyor and perpendicular thereto;
   a holding means on said second conveyor to hold asparagus while it is being sawed;
   a saw means operating in association with said second conveyor means and said holding means to saw the butt portions off of asparagus stalks traveling on said second conveyor;
   a separator means at the end of said second conveyor for separating said asparagus spears into long and short spears;
   a third conveyor means receiving the separated long and short asparagus spears in a separated relationship traveling in a perpendicularly inclined relationship to said second conveyor means, said conveyor depositing said short spears in a receiving means and transporting the longer spears to a serrated fourth conveyor means traveling perpendicular to said third conveyor;
   said fourth conveyor having an adjustable saw in operational engagement therewith to cut said long spears to a predetermined tip length, means for removing and packing the cut spear tips and separating said spear tips from the remaining asparagus stalk and storing said remaining stalk.

2. The asparagus harvesting machine of claim 1 wherein the asparagus cutting means and the asparagus pick-up and transferring means being centrally mounted on said tractor frame.

3. The asparagus harvesting machine of claim 1 wherein the first conveyor is longitudinally serrated to retain said asparagus stalks on said conveyor.

4. The asparagus harvesting machine of claim 1 wherein said second conveyor is transversely serrated to aid in said cutting of said butt portions from said asparagus stalks and to aid in their movement to said sorting means.

5. The asparagus harvesting machine of claim 1 wherein said fourth conveyor having segmented serrations with stop members therebetween to provide adjustment positions for said adjustable saw.

6. The asparagus harvesting machine of claim 1 wherein said separator means at the end of said second conveyor comprising:
   a sorting plate located below said conveyor with one edge of said plate medially located in relationship to the center of said conveyor belt so that short asparagus stalks will fall off the edge of said sorting plate and long asparagus stalks will roll over said sorting plate thereby placing long asparagus stalks on one side of said third conveyor belt and said short stalks on the other side of said conveyor belt.

7. The asparagus harvesting machine of claim 1 wherein said third conveyor having a divider member thereon to transfer the short asparagus stalks from said conveyor to said receiving means.

References Cited

UNITED STATES PATENTS

| | | | |
|---|---|---|---|
| 1,333,858 | 3/1920 | Low et al. | 146—81 |
| 2,791,878 | 5/1957 | Kepner | 56—327 |
| 3,353,577 | 11/1967 | Bruel et al. | 146—81 |

RUSSELL R. KINSEY, Primary Examiner

U.S. Cl. X.R.

146—81